3,666,367
DIGITAL RANGE MEASURING SYSTEM
Robert P. Farnsworth, Los Angeles, and Richard W. Wyeth, Agoura, Calif., assignors to Hughes Aircraft Company, Culver City, Calif.
Filed June 1, 1970, Ser. No. 42,295
Int. Cl. G01c 3/08
U.S. Cl. 356—5
8 Claims

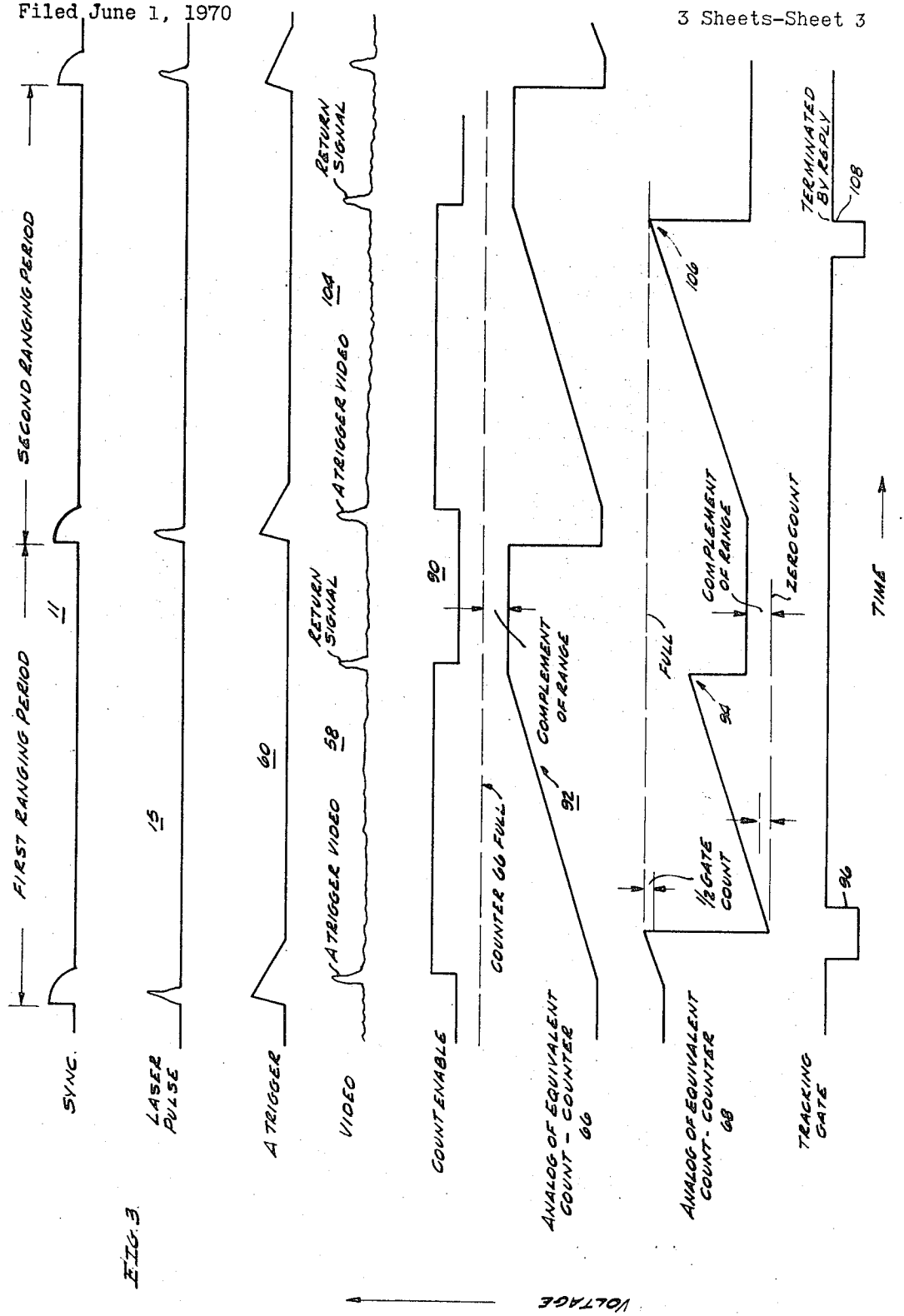

ABSTRACT OF THE DISCLOSURE

A digital system for measuring the range of a remote object in response to laser energy reflected from the object and for controlling the mode of operation. When logic circuits determine that a signal is a valid return signal (i.e. not noise energy) the system switches to a track mode of operation wherein it responds only to signals coincident with a relatively narrow tracking gate. If the return signal should fade (detectable signal not received) a counter, which stores the digital complement of the range information and which positions the tracking gate, is automatically recycled to the last stored range complement value. Another counter circuit counts unsuccessful transmission and reception (ranging) periods and after a predetermined number of consecutive such periods the system switches from the track to the acquisition mode.

BACKGROUND OF THE INVENTION

This invention relates generally to range measuring devices and more particularly to digital range measuring and tracking systems.

High range resolution (accuracy) in tracking systems may be obtained from digital mechanizations, and the digital approach also offers cost and weight savings resulting from integrated and microminiature circuits. Additionally, a digitized range tracking system minimizes temperature sensitivity, eliminates the need for alignment, and minimizes cost by not requiring critical or expansive components. However, these cost and reliability advantages are realized only if the digitized range tracking system is of sufficient simplicity that the total parts count is kept within reasonable limits.

An effective digital range measuring device should incorporate means for automatically tracking the range of an object with a narrow tracking gate (window) to minimize the response of the system to false (noise) signals. Also, the system should have the capability of automatically transferring from the acquisition mode to the track mode after it is established that the received signals represent valid returns and not "false alarms" resulting from noise power. Further, the system should have the capability of transferring from the track mode to the acquisition mode when the history of the received signals indicates that valid signals are no longer being received.

One of the major drawbacks with some prior digital range tracking units has been that tracking would be lost during periods of temporary signal fade. It is important therefore that a ranging system have the capability to detect the absence of a valid return signal and to utilize the last valid range information during signal fade periods.

SUMMARY OF THE INVENTION

Therefore, it is a general object of the invention to provide a range measuring system which is relatively simple to mechanize and which exhibits improved accuracy and reliability.

It is a further object to provide a digital ranging unit which incorporates an improved method of updating range information after ranging periods in which valid return signals are received and for reutilizing the last valid range information after periods of unsuccessful ranging attempts.

It is a more specific object of the invention to provide an improved digital range measuring system which provides: a tracking range gate (window) to minimize response to false signals; automatic transfer to the track mode from the acquisition mode when consistent signals have been received; and automatic return to the acquisition mode from the track mode when a preselected number of consecutive ranging tries have proven unsuccessful.

The subject invention may be used in conjunction with an energy transmission and reception system such as laser or radar systems, for example, for determining the precise range to an object by measuring the elapsed time between the transmission of a pulse of energy and the reception of a portion of this energy which had been reflected from the object. In accordance with the invention a signal synchronized with the transmitted energy pulse (start signal) is applied to gating circuits to gate clock signals to a range measurement counter. A signal derived from the received reflected energy (stop signal) is utilized by the last mentioned gating circuits to inhibit further application of clock signals to the range measurement counter during the remainder of a particular transmission and reception period.

The range measurement counter controls a wide range gate circuit which provides a wide gate fixed in time relative to the transmitted energy pulse. This wide gate is utilized in the subject system to limit the video being processed in the acquisition mode of operation (i.e. when the ranging process is first initiated) to that received within a minimum and a maximum range of interest.

A range gate position and range storage counter is coupled to the range measurement counter through a transfer control logic circuit. The transfer control logic circuit allows the first mentioned counter to be updated by a parallel transfer of data from the range measurement counter only during those ranging periods in which a valid return signal had been received.

One of the unique aspects of the subject invention which allows reliable range measurements with a relatively simple digital design is the mechanization of the range gate position and range storage counter such that it stores the complement of the range information measured by the range measurement counter. During a ranging period in which a valid return signal is not received, the range measurement counter will count to its maximum capacity at which time a "maximum count indicator" circuit will apply a signal to inhibit the further application of clock pulses to either of the counters for the remaining portion of that ranging period. The range measurement counter and the range gate position and range storage counter are by design selected to have the same count capacity. It should be noted that during ranging cycles where a valid return signal is not received, the range measurement counter is counted to its maximum capacity and then the clock signals are inhibited for the further duration of the ranging cycle. During the time period when the range measurement counter counts to a maximum count the range gate position and range storage counter has also counted a complete cycle so it again contains the digital number corresponding to the complement of the range information stored during the last valid cycle.

A "loss of track" circuit is provided for counting the number of ranging periods during which a valid received signal was not detected. After a predetermined number of consecutive such periods without a valid return signal, the last mentioned circuit causes the system to revert to the acquisition mode on the assumption that the object being tracked has somehow moved outside the range of the tracking gate.

BRIEF DESCRIPTION OF THE DRAWINGS

The foregoing and other objects and advantages of the invention will become more fully apparent from the following description taken in conjunction with the accompanying drawings wherein:

FIG. 3 is a drawing of voltage amplitude versus time waveforms for explaining the operation of portions of the digital range measuring unit of FIG. 2.

DESCRIPTION OF THE PREFERRED EMBODIMENT

Figure 1:
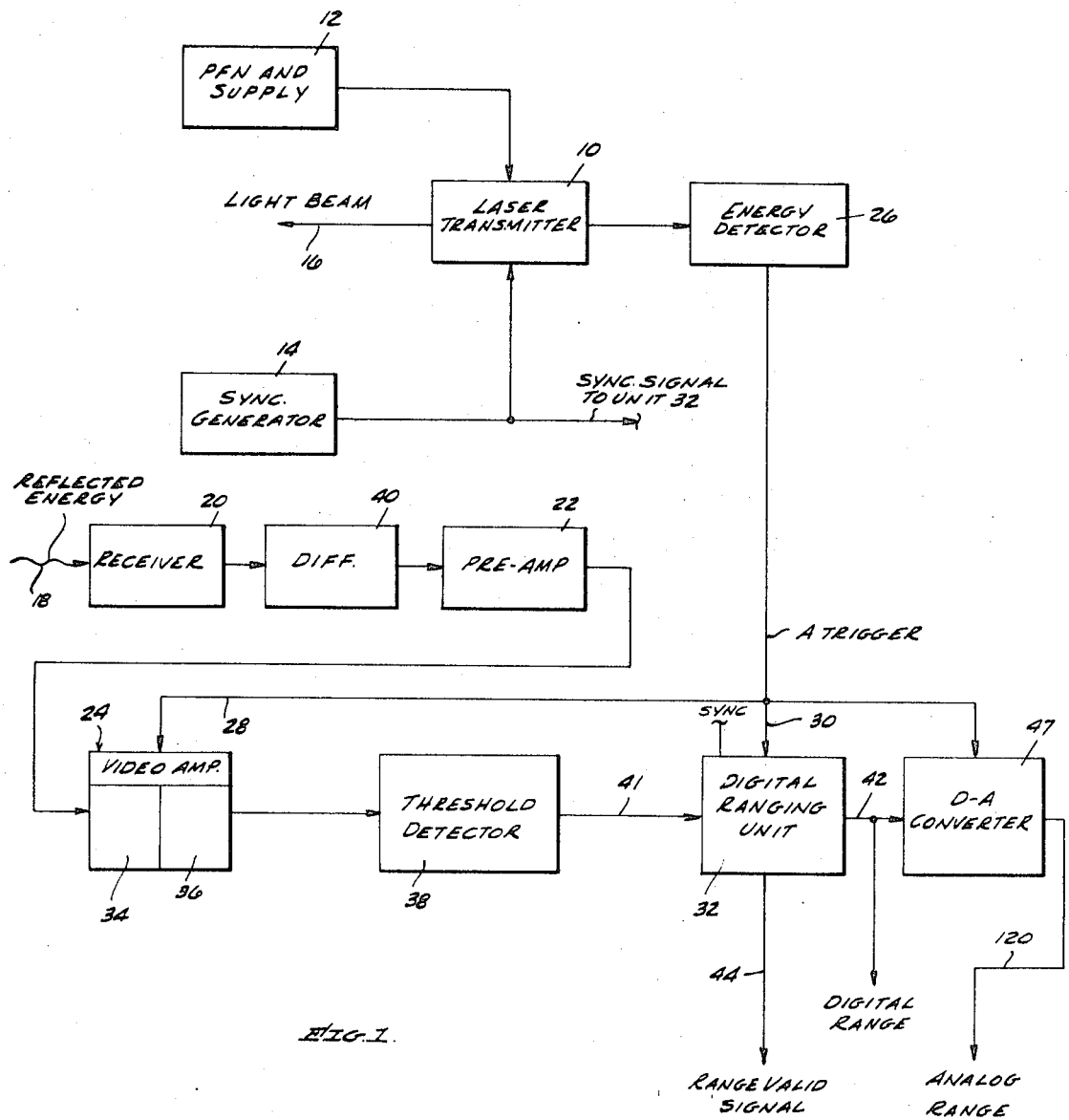
FIG. 1 is a block diagram of a laser transmission and reception system incorporating a digital range measuring unit in accordance with the subject invention.

Reference is first directed to FIG. 1 which shows a laser transmission and reception system incorporating a digital range measuring unit in accordance with the subject invention. A laser transmitter 10 is coupled to and energized by a pulse forming network (PFN) and supply unit 12. When the transmitter unit 10 is triggered by a synchronization signal (waveform 11 of FIG. 3) applied from a sync signal generator 14 a pulse of light 16 (waveform 15 of FIG. 3) is transmitted. The system of FIG. 1 may be operated at a repetition frequency of, for example, thirty pulses per second. However, it is to be understood that the digital range measuring unit in accordance with this invention is not restricted to any particular type of transmission and reception system nor to any particular range of repetition frequencies. As the description proceeds it will become apparent that the digital range measuring unit of the subject invention is quite adaptable to any of the numerous suitable transmission and reception systems, for example, radar systems.

When the transmitted light pulse 16 impinges upon a reflective object (not shown) a portion 18 of the light energy is reflected from the object and received by the receiver 20. The receiver 20 may comprise any suitable type detector such as a photodiode. The output signal from the receiver 20 is series processed through a differentiator unit 40, a preamplifier unit 22 and a video amplifier unit 24.

The output signal from the receiver 20 is first processed through the differentiator circuit 40 prior to its application to the preamplifier 22. The differentiator 40 serves to improve range accuracy by reducing the variation in the timing error for large amplitude changes in input signals.

A portion of the light energy from the transmitter unit 10 is applied to an energy detector 26 which may be any suitable fast responding sensor such as a photodiode, for example. The output signal of the detector 26 (waveform 60 of FIG. 3) represents with negligible time delay the time of occurrence of the transmitted light pulse 16. This just reference signal is sometimes hereinafter referred to as the "A trigger" signal. The output signal from the energy detector 26 is applied in parallel to the video amplifier 24 and to the digital ranging unit 32 on leads 28 and 30 respectively.

The video amplifier 24 may be a two-stage integrated linear amplifier with one stage 34 being mechanized for time programmed gain control and another stage 36 for automatic gain control. The output signal from detector 26 (A trigger) may be used to synchronize the beginning of the gain program in stage 34 of video amplifier 24. The time programmed gain control circuits are usually programmed to reduce the gain at the start of a ranging period and to then recover along a range squared ($R^2$) curve during the first part of a ranging cycle. The resulting reduction in gain at short ranges reduces spurious response due to atmospheric backscattering as well as improving the average signal-to-noise ratio by reducing the gain at ranges where saturating signals could be expected in the rceived video from preamplifier 22. The automatic gain control stage 36 may include circuits which sample the output signal of amplifier 24 and apply a negative feedback signal to reduce the gain of the stage as a function of the amplitude of the output signal.

The signal from the detector 26 (A trigger) may be summed with the output signal of the preamplifier 22 in the input stage of the video amplifier 24. Alternatively, optical coupling (not shown) between the receiver 20 and the transmitter 10 may be utilized to combine the "A trigger" signal with the received signal. As will be explained subsequently, the "A trigger" signal after being processed through the video amplifier 24, the threshold detector 38 is utilized to start the counting sequence of a range measuring counter in the ranging unit 32. The video signal developed from the received reflected signal is used to stop the counting sequence of the range measuring counter. By processing both the start and stop video signals through the same video amplifier and processing circuits any processing delay acts on both of the last mentioned signals and causes no significant effect on range accuracy.

The video signals at the output of amplifier 24 are processed through threshold detector 38, which may be any one of the numerous suitable threshold devices, to reduce the rate of "false alarm" signals resulting from spurious or noise signals.

The output signals of the ranging unit 32 is a digital range signal which is applied in parallel on a composite lead 42 to a digital computer type utilization device (not shown) and may be applied to a digital-to-analog converter unit 47. The output signal from this last mentioned unit may then be applied to an analog utilization device (not shown).

Figure 2:
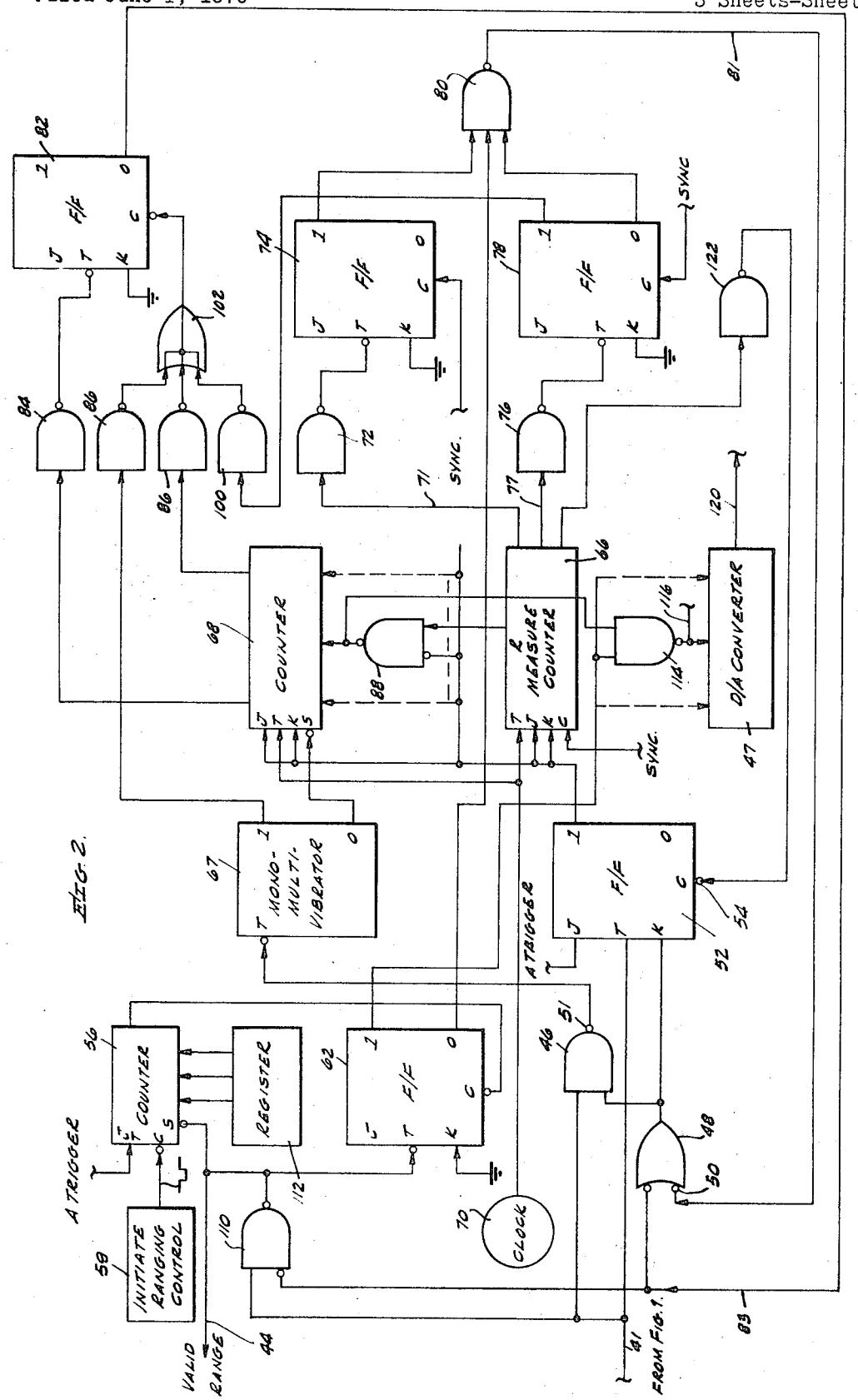
FIG. 2 is a block and schematic diagram of a digital range measuring unit in accordance with the invention.

Digital range unit 32 is shown in greater deail in FIG. 2 and reference is now primarily directed to that figure. However, before explaining the detailed operation of the digital ranging unit 32 it may be helpful to first explain or clarify the logic symbols used in FIG. 2. The digital circuits of FIG. 2 are enabled by positive signals or positive signals or positive going transitions, unless otherwise indicated. The logical one state is represented by a positive voltage (+V) and the logical zero state by a ground level (zero potential) voltage. The AND and OR functions are depicted by the normally used bullet-shaped structure with respectively straight or curved end lines such as indicated by reference numerals 46 and 48 respectively. A small circle such as 50, for example, at the input terminal of a logic function circuit diagram indicates that the activating signal is a logical zero. A small circle such as 51 for example, at the output terminal of a logic function circuit diagram indicates that the activated state of the device is a logical zero. The gates may be conventional diode logic, NOR or NAND with or without inverters where required by the symbology.

Flip-flop circuits, such as circuit 52, are the conventional J-K logic function type with the J and K terminals normally being enabled for respective set and reset operations by a positive signal. However, a small circle, such as the circle designated 54 on flip-flop 52 for example, at a flip-flop input terminal indicates that the function is enabled by a nonpositive or ground level signal. The T terminal of the flip-flop circuits may be considered as the normal clock input terminal and has been designated T so as not to confuse it with the clear terminal which carries the C designation. When the C terminal of any flip-flop is enabled, the 1 output terminal is at the low or ground potential level and the 0 output terminal is at the high or positive potential level. If a J or K terminal does not have an input lead shown connected thereto, it is to be considered as always enabled, but if such a terminal is shown as grounded (connected to the zero reference plane) it is never enabled.

Counters shown in FIG. 2 incorporate the same basic symbology as discussed above for the flip-flop circuits. Additionally, when the s (strobe) input terminal of a counter is enabled each stage of the counter is switched to the same state as the digital signal applied to the data input of each respective stage thereof.

In the operation of the digital ranging unit 32, the video signal from the threshold circuit 38 (FIG. 1) is applied on the lead 41 to the T terminal of a "count enable" flip-flop 52. It may be assumed for the present discussion, and will be explained in detail subsequently, that the flip-flop 52 is in the cleared condition (the 1 output terminal at the low level) at the start of a ranging period. A ranging period may be considered as the time period from one laser transmitted pulse to the next subsequent laser transmitted pulse.

The waveform of a typical video signal applied to the ranging unit 32 on the lead 41 is shown in FIG. 3 as waveform 58. The "A trigger" signal applied on the lead 30 is shown as waveform 60. It is noted from the just referenced waveforms that the "A trigger" *video* signal (the "A trigger" signal after being processed by units 24, and 38—see waveform 58) which is applied to the T terminal of flip-flop 52 is in coincidence with the "A trigger" signal (waveform 60) applied to the J terminal and hence the flip-flop 52 is set by the application of the last two mentioned signals (the 1 output terminal of flip-flop 52 goes high).

An initiate ranging control circuit 59, which may include a simple manually operated push-button switch, applies a negative going pulse to the C terminal of a "loss of track" counter 56 when the control is activated to commence the ranging operation. Operation of control 59 causes clearing of counter 56, in turn causing an "acquisition" flip-flop 62 to be cleared thereby applying a positive signal to the centrally located input terminal of a wide range gate generating gate 80.

When the "count enable" flip-flop 52 is set as described above, a positive signal is applied from the 1 output terminal of the flip-flop 52 to the J and K input terminals of a range measurement counter 66 and a "range gate positioning and storage" counter 68. The range measurement counter 66 is cleared by the sync signal (waveform 11 of FIG. 3) at the start of each ranging period and counts the clock pulses applied from the clock 70 (a 50 megahertz oscillator, for example) during the time period that flip-flop 52 is enabled. Flip-flop 52 is enabled during the time period between the "A trigger" video and the reflected return signal shown in waveform 58 of FIG. 3.

Selected binary stages which correspond to the digital value of the minimum range of interest are applied to a minimum range gate circuit 72 on a composite lead 71. Gate 72 enables the flip-flop 74 at the time the count in counter 66 indicates that the minimum range of interest has been reached.

In a similar manner a maximum range gate 76 has input terminals coupled to selected stages of the range measurement counter 66 by a composite lead 77. Maximum range flip-flop 78 is set in response to an enabling signal applied from the gate 76 when the count in the range measurement counter 66 corresponds to the digital value of the maximum range increment of interest. The minimum and maximum range flip-flops 74 and 78 respectively, are cleared at the start of each ranging sequence by the application of the sync signal to the clear (C) terminals of the flip-flop circuits 74 and 78. The output signal from the gate 80 which combines the information concerning minimum range, maximum range and the mode of operation (acquisition or track) is applied on a lead 81 to the gate 48.

During the acquisition mode of operation, i.e. during the initial period immediately after ranging has been initiated, the minimum/maximum range gate (sometimes referred to as the wide gate) is applied from gate 80 through gate 48 to control the operation of the "count enable" flip-flop 52 and hence the counters 66 and 68. As will be explained subsequently once it has been determined that the particular return signal represents a valid signal to be tracked, flip-flop 62 is set and the system automatically switches to a tracking mode of operation. During the tracking mode of operation the system only responds to signals within a narrow tracking gate. The minimum/maximum range gate generated by circuit 80 is disenabled with flip-flop 62 is set.

The narrow range gate (sometimes hereinafter referred to as the tracking gate) is generated by a flip-flop circuit 82 and is applied to the OR gate 48 on the lead 83.

If a video return signal is applied to terminal T of the flip-flop 52 coincident with the application of either the acquisition gate (wide gate) or the track gate to the K terminal, then the flip-flop circuit 52 is reset and the counting sequence of both counters 66 and 68 is interrupted.

Additionally, if the coincidence of return signal and video and either the acquisition or the track gate is detected by gating circuit 46, then monostable multivibrator circuit 67 momentarily enables the strobe circuit of counter 68. Each stage of the counter 66 is coupled through a gating circuit such as gating circuit 88 to a corresponding stage of the counter 68. It is noted from FIG. 2 that the logic function of gate 88 is such that it is enabled only during the period that the counters are not counting. Additionally, the coupling between counters 66 and 68 is such that when the strobe terminal of the counter 68 is enabled by the output signal of the monostable multivibrator 67 it is the "complement" of the range information contained in counter 66 which is shifted in parallel into counter 68.

The operation of counters 66, 68 and their associated circuits is fundamental to the understanding of the subject invention and may be more readily explained by referring to the waveforms of FIG. 3. As shown by waveform 90 of FIG. 3, the "count enable" flip-flop 52 enables counters 66 and 68 during the time period between the occurrence of "A trigger" video and the reflected return signal. The range value of the count stored in the counters 66 and 68 during a first ranging period is indicated by reference numerals 92 and 94 respectively in FIG. 3. It is noted that during the first ranging sequence the counter 68 may have stored therein any arbitrary count and the first tracking gate signal, indicated by reference numeral 96 of FIG. 3, will not necessarily be in coincidence with the reflected return signal.

Referring momentarily to the circuits of FIG. 2 for mechanizing the tracking gate as well as to the waveforms of FIG. 3, the operation and mechanization of the tracking gate will now be described. One of the unique features of the subject digital ranging system is that the tracking gate may be started and stopped at predetermined digital counts of the counter 68 regardless of the range of the signal being tracked. In particularly, the gate 84 is coupled to the appropriate stages of the counter 68 and to the tracking gate flip-flop 82 such that the last mentioned flip-flop is set at a time corresponding to one-half of a gate width preceding the storage of a full count in the counter 68. By the same token a gate 86 is coupled between appropriate stages of the counter 88 and the flip-flop 82 so that the flip-flop is cleared one-half tracking gate width after the counter has started counting up from a zero count (one-half tracking gate width after counter 68 had overflowed).

The trailing edge of the tracking gate can be positioned by either circuit 86, 98 or 100 which circuits are all coupled to flip-flop 82 through an OR gate 102. Circuit 98 terminates the tracking gate upon the occurrence of a reply signal as indicated by an output signal from monostable multivibrator 67. Circuit 86 would terminate the tracking gate, if it had not been terminated by the occurrence of a reply signal previously, one-half gate width after the counter 68 starts its count up from zero following a full count condition. Gate 100 is utilized to terminate the tracking gate if the maximum tracking range has been reached prior to the time the gate is terminated by any of the just described gate termination circuits.

As discussed previously, during the first ranging period, upon the occurrence of the return signal, monostable multivibrator 67 strobes counter 68 thereby causing the digital number which is equal to the complement of the range value to be shifted in parallel to counter 68 from counter 66.

During the second ranging period, flip-flop 52 is set at the beginning of the period by the application of the "A trigger" signal (waveform 60) and the "A trigger" video signal (waveform 58) as was explained previously, and counter 66 counts the range between the "A trigger" video and the return signal. At the same time that counter 66 is counting the range during the second sequence, the counter 68 which starts its count at a value equal to the complement of the previously measured range information, will count upwards and gate 84 provides a tracking gate enabled signal one-half gate width prior to the point in time where the counter 68 reaches a full count. After the counter 68 reaches the full condition it overflows and continues counting from zero. One-half track gate width after the zero count, if a return signal is not first received, the gate 86 will reset the flip-flop 82 terminating the tracking gate. It is noted that the tracking gate (waveform 108, FIG. 3) generated during the second ranging period, was terminated by the receipt of a return signal prior to the end of the normal gate duration. The relationship between the video signal, the operation of the counter 68 and the time position of the tracking gate during the second ranging sequence are indicated by reference numerals 104, 106 and 108 respectively in FIG. 3.

During the second tracking sequence, assuming the return signal is present during two consecutive ranging tries, the return video signal will be coincident with the tracking gate (window) at the gate 110 thereby generating a "valid range" signal (lead 44, FIG. 2) at the output of this last mentioned gate circuit. The "valid range" signal sets acquisition flip-flop 62 which removes the signal to the central input terminal of minimum/maximum range gate 80. The disenabling of gate 80 switches the ranging unit 32 to the track mode, and in the track mode of operation the system is only responsive to return signals coincident in time with the track gate.

The "valid range" signal from gate 110 is also applied to a strobe input terminal of the counter 56 thereby causing the counter to be set to the predetermined digital number "0 0 1" stored in a register 112. Each time a "valid range" signal is generated the counter 56 is reset to the last mentioned number and the ranging system 32 stays in the track mode of operation. However, if the return signal fades or if the tracking is lost for four consecutive ranging intervals, then the last stage of the counter 56 switches to the low level. This counter counts each ranging interval due to the "A trigger" signal applied to the T input thereof. When the 1 (output) terminal of the last stage of counter 56 goes low the acquisition flip-flop 62 is cleared and the ranging system is returned to the acquisition mode of operation. It will be recalled that in the acquisition mode the gate 80 is enabled and minimum/maximum range gate signals are generated to control the 'count enable" flip-flop 52. It will also be recalled that in the acquisition mode the system responds to return signals received throughout the entire minimum/maximum range interval. Following the end of each counting period, when the system is in the track mode of operation, each stage of the range counter 66 is coupled through gates such as gates 88 and 114 to digital output leads such as lead 116. In the interest of simplicity and clarity of the drawings the gates coupling only one stage are shown, as is only one output lead. It will be understood, however, that similar gates and output leads are provided for each stage of the binary counter 66. Also, each stage of the counter 66 is coupled through the just described gates to the digital-to-analog converter unit 47.

The analog output signal from the unit 47, applied on lead 120, represents the range of the return signal being tracked by the ranging unit 32.

A gate 122 is coupled to counter 66 such that if no return signal is received during a ranging period, then when the counter 66 reaches a full count gate 122 generates a "counter full" signal. This signal is applied to the clear input terminal of flip-flop 52 and thereby terminates the counting operation for the remainder of that particular ranging period. This is important in the operation of the subject system since it allow counter 68 to operate as a storage device for range data produced during a preceding ranging period when a fade of return signal is encountered. This is due to the fact that by design counters 66 and 68 are of the same capacity (same number of binary stages). Hence, if no video return is received during a ranging cycle then during the time period required by counter 66 to reach a full count, counter 68 will have completed a counting cycle and would be back at the same digital number, representing the complement of range, which was held during the previous ranging period. During a ranging cycle in which coincidence between the tracking gate and the video is not detected in the gate 46 the multivibrator circuit 67 is not activated and therefore a transfer of data between the range measurement counter 66 and the storage counter 68 does not take place.

Now that the mechanization and operation of the subject invention have been described in detail it may be helpful at this point to summarize some of the more important features and advantages thereof.

The ranging operation is initiated by applying a negative going signal from the initiate ranging control unit 59. This signal clears the divide by four counter 56 and thereby sets the acquisition flip-flop 62. When flip-flop 62 is in the set condition gate 80 is enabled and, in association with flip-flops 74 and 78, generates the minimum/maximum range gate applied through OR gate 48 to control the "count enable" flip-flop 52. This last mentioned flip-flop controls the counting periods of counter 66 and 68. It is during the portion of the ranging operation in which the minimum/maximum range gate is generated that the ranging unit 32 is in the acquisition mode. During the acquisition mode the system is responsive to return signals that occur anywhere within the minimum/maximum range interval.

During the first ranging period the counter 66 counts clock pulses for the time period between the "A trigger" video and the return signal. Therefore the count contained in the counter at the end of this period is representative of the digital range to the object which produced the reflected signal. At the end of the counting period during the first ranging sequence coincidence between the acquisition gate and the return signal is detected within gate 46 and the gate positioning and storage counter 68 is strobed. Upon the strobing of counter 68 a signal representative of the complement of the range value stored in counter 66 is parallel shifted from the counter 66 to the counter 68. During the second ranging period the counter 68 and associated logic circuits use the complementary range information stored during the previous period to position a track gate at the range interval corresponding to the range measured during the first period.

During the second ranging period if a return signal has been received, gate 110 senses the coincidence between that signal and the tracking gate and sets flip-flop 62 thereby switching the system to the track mode of operation.

In the track mode of operation the system only responds to signals within the narrow or track gate generated by flip-flop circuit 82, and range information is fed to output leads 116 and 120 at the end of each counting sequence.

The system continues in the track mode until another initiate track pulse is generated by control circuit 59 or until it is determined that tracking has been lost. This determination is automatically made by the system and in the illustrated embodiment the divide by four counter 56 returns the system to the acquisition mode if a valid return signal is not in coincidence with the tracking gate during four consecutive ranging tries.

During ranging tries in which return signals are not received, counter 66 will count to its maximum at which time the counting operation will be discontinued by the signal generated within gate 122. In accordance with the subject invention, periodic loss of the return signal does not significantly affect the ranging operation. This is because the counter 68 stores the last previously valid range information and uses this information to position the tracking gate until valid return signals are received and the data is updated, or until the system makes the determination that tracking has been lost (i.e. the probability is high that the object has moved outside the range of the tracking gate).

Hence, there has been described a new and improved range measuring system which offers the increased accuracy and reliability of a digital mechanization and which includes: an automatic tracking range window to minimize response to false signals; automatic transfer to the track mode from the acquisition mode when consistent signals are received; and automatic transfer from the track to the acquisition mode when a preset number of consecutive ranging tries prove unsuccessful.

What is claimed is:

1. A range tracking device for a pulsed energy transmission and reception system, said device comprising:
   first means responsive to received energy and to a tracking gate signal, for providing during successive ranging periods in which reflected energy from a selected target is received, a first signal representative of the complement of the range to said target;
   second means responsive to said first signal for providing said tracking gate signal to said first means in time coincidence with the reflected energy received from said selected target, said second means including a first counter adapted for counting clock pulses applied thereto and having a preselected maximum counting capacity;
   third means for coupling said first means to said first counter during ranging intervals in which reflected energy is received from said selected target, so as to set said first counter to the value of said first signal; and
   fourth means for applying clock pulses to said first counter during each ranging period until said first counter is set by said third means or until a number of clock pulses equal to said preselected maximum counting capacity has been applied; whereby during ranging periods in which reflected energy from said selected target is not received said first counter is counted around to the value of the first signal applied thereto during a preceding ranging period.

2. The device of claim 1 further comprising fifth means for allowing said first means to respond to received energy from a ranging interval larger than that defined by said tracking gate signal prior to the initial coincidence between the received energy and said tracking gate signal, and for then limiting the response of said first means to received energy in time coincidence with said tracking gate signal.

3. The device of claim 2 further comprising sixth means for allowing said first means, after said initial coincidence, to respond to received energy from said larger ranging interval if noncoincidence between received energy and said tracking gate signal occurs for a preselected number of consecutive ranging periods, and for again limiting the response of said first means to received energy in coincidence with said tracking gate after coincidence between the reflected energy and said tracking gate signal is again detected.

4. The device of claim 2 wherein said first means includes a second counter adapted for receiving said clock pulses during the period between the transmission of the energy pulse and the reception of reflected energy from said selected target, said second counter having a maximum count capacity equal to the number of clock pulses which occur during said preselected maximum range interval, and sxith means for generating an acquisition gate coincident in time with said larger ranging interval; said sixth means being coupled to said second counter such that said acquisition gate is started at a first predetermined count of said second counter and is ended at a second predetermined count of said second counter.

5. The device of claim 1 wherein said first means further comprises means for applying a second signal representative of the range of said selected target, to an output device only during ranging periods in which the response of said first means is limited to received energy in time coincidence with said tracking gate signal.

6. The device of claim 1 wherein said first means includes a second counter adapted for receiving said clock pulses during the period between the transmission of the energy pulse and the reception of the reflected energy; said second counter having a maximum counting capacity equal to the number of clock pulses which occur during said preselected maximum range time interval; and said fourth means includes means responsive to a full count in said second counter for terminating the counting sequence of said first and second counters during the remainder of a particular ranging period.

7. The device of claim 1 wherein said second means includes means coupled to said second counter for terminating said tracking gate at the end of said preselected maximum range time interval.

8. The device of claim 1 wherein said second means includes means for generating said tracking gate signal during a time period starting at a first preselected count of said first counter and terminating at the first event to occur from a group of events including the first counter counting a second preselected number, the reception of reflected energy from said selected target and the end of said preselected maximum ranging interval.

References Cited
UNITED STATES PATENTS

| | | | |
|---|---|---|---|
| 3,344,421 | 9/1967 | Dildy, Jr. | 343—7.3 |
| 3,500,302 | 3/1970 | Moss, Jr. et al. | 343—7.3 |

BENJAMIN A. BORCHELT, Primary Examiner

S. C. BUCZINSKI, Assistant Examiner

U.S. Cl. X.R.

343—7.3